(12) United States Patent
Can et al.

(10) Patent No.: US 12,367,345 B2
(45) Date of Patent: *Jul. 22, 2025

(54) IDENTIFYING HIGH EFFORT STATEMENTS FOR CALL CENTER SUMMARIES

(71) Applicant: Capital One Services, LLC, McLean, VA (US)

(72) Inventors: Aysu Ezen Can, Cary, NC (US); Zachary S. Brown, Midlothian, VA (US); Chris Symons, Hilton, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,933

(22) Filed: May 17, 2024

(65) Prior Publication Data

US 2024/0378386 A1    Nov. 14, 2024

Related U.S. Application Data

(63) Continuation of application No. 17/698,018, filed on Mar. 18, 2022, now Pat. No. 11,989,514.

(51) Int. Cl.
*G06F 40/30* (2020.01)
*G06F 40/166* (2020.01)
(Continued)

(52) U.S. Cl.
CPC .......... *G06F 40/284* (2020.01); *G06F 40/166* (2020.01); *G10L 15/063* (2013.01);
(Continued)

(58) Field of Classification Search
None
See application file for complete search history.

(56) References Cited

U.S. PATENT DOCUMENTS

| 8,411,841 B2 | 4/2013 | Edwards et al. |
| 9,124,697 B2 | 9/2015 | Scott et al. |

(Continued)

OTHER PUBLICATIONS

Vaswani, Ashish, et al. "Attention Is All You Need." 31st Conference on Neural Information Processing Systems, Long Beach, CA (NIPS 2017); 11 pages.

(Continued)

*Primary Examiner* — Nafiz E Hoque
(74) *Attorney, Agent, or Firm* — Sterne, Kessler, Goldstein & Fox P.L.L.C.

(57) ABSTRACT

Disclosed herein are system, method, and computer program product embodiments for machine learning systems to process incoming call-center calls to provide communication summaries that capture effort levels of statements made during interactive communications. For a given call, the system receives a transcript as the input and generates a textual summary as the output. In order to improve a call summary and customize a summarization task to a call center domain, the technology disclosed herein may employ a classifier that predicts an effort level and attention score for individual utterances within a call transcript, ranks the attention scores and uses selected ones of the ranked utterances in the summary.

20 Claims, 8 Drawing Sheets

| | Sample Utterances | Possible Summaries |
|---|---|---|
| 602 | hi um i'm having trouble getting in uh using my app it's not connecting with a current phone number i have and that device that i have as well (H) | Customer needs help connecting phone number with app. — 610 |
| 604 | i guess it said cash withdrawal though i'm just at costco here and my card's not going through um i know i have a past due but i called today and told them that i'm (H) | Customer's card not working and they have a balance due — 612 |
| 606 | i saw a charge pending charge for the washington post for :d: :d: :d: i have no subscription with the washington post i have no reason to believe that they're going through the fraud me i do not want a new credit card i did not want this credit card a lot i just want that charge removed and that a transaction flagged is not being something that should be recurring (H) | Customer reported a fraud alert. — 614 |
| 608 | so what website do i go for like capital one (H) then to get that because the thing i have an issue is i don't want to get my routing number | Customer wanted to make a payment without needing routing number. — 616 |

(51) Int. Cl.
*G06F 40/284* (2020.01)
*G10L 15/06* (2013.01)
*G10L 15/16* (2006.01)
*G10L 15/22* (2006.01)
*H04M 3/42* (2006.01)
*H04M 3/51* (2006.01)

(52) U.S. Cl.
CPC .............. *G10L 15/16* (2013.01); *G10L 15/22* (2013.01); *H04M 3/42221* (2013.01); *H04M 3/5175* (2013.01); *G06F 40/30* (2020.01); *H04M 2201/40* (2013.01)

(56) References Cited

U.S. PATENT DOCUMENTS

| | | |
|---|---|---|
| 9,160,852 B2 | 10/2015 | Ripa et al. |
| 9,723,151 B2 | 8/2017 | McGann et al. |
| 9,900,436 B2 | 2/2018 | Raanani et al. |
| 10,645,224 B2 | 5/2020 | Dwyer et al. |
| 10,896,428 B1 | 1/2021 | Balasubramaniam et al. |
| 11,076,047 B1 | 7/2021 | Clodore et al. |
| 11,989,514 B2 | 5/2024 | Can et al. |
| 2005/0100159 A1 | 5/2005 | Fink et al. |
| 2010/0332287 A1 | 12/2010 | Gates et al. |
| 2019/0253558 A1 | 8/2019 | Haukioja et al. |
| 2020/0151648 A1 | 5/2020 | Gorny |
| 2021/0043211 A1* | 2/2021 | Leidner .................. G06F 16/35 |
| 2021/0304747 A1* | 9/2021 | Haas ..................... G06Q 30/016 |
| 2021/0311973 A1* | 10/2021 | Radhakrishnan ....... G06F 40/30 |
| 2022/0189484 A1* | 6/2022 | Malladi ................... G10L 15/01 |
| 2023/0086668 A1* | 3/2023 | Murakhovs'ka ........ G10L 15/22 704/235 |
| 2023/0122429 A1* | 4/2023 | Gunasekara ............ G06N 3/08 705/304 |
| 2023/0252971 A1* | 8/2023 | Qureshi ................ G10L 13/047 704/259 |
| 2023/0281394 A1* | 9/2023 | Kuroda .................. G06N 20/10 704/9 |

OTHER PUBLICATIONS

Hovy, Eduard, and Chin-Yew Lin. "Automated text summarization in Summarist." Advances in automatic text summarization 14 (1999): 81-94; 19 pages.

Aone, Chinatsu, et al. "A scalable summarization system using robust NLP." Intelligent Scalable Text Summarization. 1997; 8 pages.

Aone, Chinatsu, Mary Ellen Okurowski, and James Gorlinsky. "Trainable, scalable summarization using robust NLP and machine learning." 36th Annual Meeting of the Association for Computational Linguistics and 17th International Conference on Computational Linguistics, vol. 1. 1998; 5 pages.

Tas, Oguzhan, and Farzad Kiyani. "A survey automatic text summarization." PressAcademia Procedia 5.1 (2007): 205-213; 10 pages.

\* cited by examiner

| Sample Utterances | Possible Summaries |
|---|---|
| hi um i'm having trouble getting in uh using my [app] it's not connecting with a current [phone number] i have and that device that i have as well (H) — 602 | Customer needs help connecting [phone number] with [app]. — 610 |
| i guess it said cash withdrawal though i'm just at costco here and [my card's] not going through um i know i have a past due but i called today and told them that i'm (H) — 604 | Customer's card [not working and they have a balance due]. — 612 |
| i saw a charge pending charge for the washington post for :d: :d: :d: i have no subscription with the washington post i have no reason to believe that they're going through the [fraud] me i do not want a new credit card i did not want this credit card a lot i just want that charge removed and that a transaction flagged is not being something that should be recurring (H) — 606 | Customer reported a [fraud] alert. — 614 |
| so what website do i go for like capital one (H) then to get that because the thing i have an issue is [i don't want to get my routing number] — 608 | Customer wanted to make a payment [without] needing routing number. — 616 |

FIG. 6A

| Sample Utterances | Possible Summaries |
|---|---|
| i normally just give certain numbers i don't want my routing number and all that stuff going so how do i just like make a payment without all that (H) | |
| hi um i got a reported to the credit bureaus because i was late in march um my husband lost um a few jobs because of the current virus same and well that's why i wasn't able to make the payment are you guys making an exception for the virus (H) | Customer inquired about payment options related to COVID hardship. |
| yeah i uh actually just uh was uh using my card and it got declined uh i tried to use it for the first time since i got the replacement card and uh it was declined so you know (L) | Customer's card declined first time with this card |
| no is there any way i can block this much in that merchant to charge my card in the future (H) | Customer called to block a certain merchant from future transactions. |

FIG. 6B

IDENTIFYING HIGH EFFORT STATEMENTS FOR CALL CENTER SUMMARIES

CROSS-REFERENCE TO RELATED APPLICATIONS AND INCORPORATION BY REFERENCE

This is a Continuation Application of U.S. application Ser. No. 17/698,018, filed on Mar. 18, 2022, which is incorporated by reference in its entirety

BACKGROUND

Text and speech may be analyzed by computers to discover words and sentences. However, missing in current computer-based text/speech analyzers is an ability to recognize a level of effort by one or more participants during an interactive communication.

BRIEF DESCRIPTION OF THE DRAWINGS

The accompanying drawings are incorporated herein and form a part of the specification.

FIGS. 6A and 6B illustrate examples of real-time summations of high effort statements, as per some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
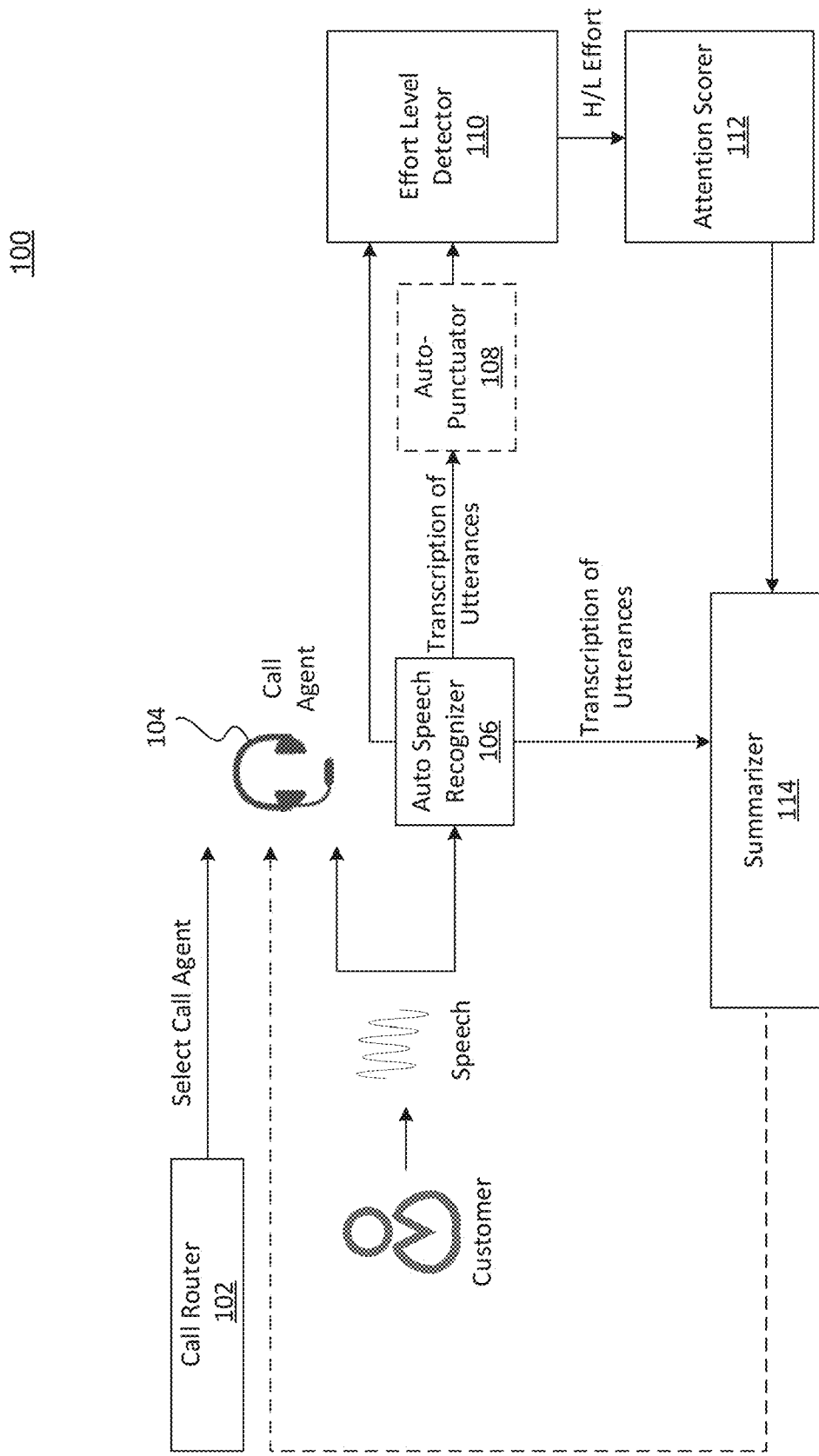
FIG. 1 is a flow diagram for a call center system processing an incoming call, according to some embodiments.

Provided herein are system, apparatus, device, method and/or computer program product embodiments, and/or combinations and sub-combinations thereof to provide communication summaries that capture effort levels of statements made during interactive communications. Effort levels may be based on analyzing customers' utterances to ascertain a level of effort needed during a call to handle one or more issues that may be of interest to the caller. For example, "my card is declined and I am having trouble at checkout" or "I needed help with the fraud transaction and this call made my day". These statements may be extracted from interactions that caller (e.g., customers) have with call agents in a call center.

The technology disclosed herein, in some embodiments, provides a framework that incorporates machine learning models to generate and/or improve machine-generated textual summaries describing interactions between callers and call agents in call centers. For a given call, the system receives a transcript as the input and generates a textual summary as the output. In order to improve a summary and customize the summary task to a call center domain, the technology disclosed herein may employ a classifier that predicts an effort level that customers make to resolve their issues.

In some embodiments, the technology disclosed herein provides a customer effort classifier that produces a binary effort level label to each call that is relevant in support of a response to the question: "Did the call agent make it easy for you?". A customer effort model is trained to infer which utterances indicate an effort level and to subsequently assign a binary effort label of high or low. The customer effort model is also trained to infer utterance attention scores (i.e., how does the utterance affect the remainder of the sentence or call). Effort labels and attention scores may be used to improve subsequently generated summaries, where the higher the attention score for a given utterance, the more that utterance contributes to the summary of the call.

In some embodiments, the technology described herein provides brief summaries of calls to call center agents, managers, and business analysts. Providing these summaries allows various entities of a call center to be more informed about each customer and thereby provide more personalized and relevant interactions. The summaries may be provided during or after a current call or before a subsequent call from a previous caller.

Customer call centers are important communication channels for building and improving relationships with customers, increasing customer satisfaction, and improving business outcomes. A typical call center gets thousands of calls on a given day. The number of agents and agent managers available to support these calls is limited. Given these constraints, providing agents, and managers of agents, with tools that improve their efficiency is important. Doing so enables them to provide a better customer experience. Currently, agents may have limited or no time to review customer profiles/histories as they handle calls. The supporting systems used by agents may provide a lot of information, but offer no easy and efficient way to review recent interactions with the current customer. Each call begins as if there is no history for a given customer. A system that summarizes calls would enable efficient review of recent calls, thereby leading to a more personalized and on-point interaction with a customer. Existing tools to transcribe speech to text are useful for pure transcription. Aspects of the presently-described system improve upon such transcription tools by intelligently identifying key concepts within the transcription based on additional audio cues or entered feedback, and generating an intelligent summary of the transcription text representing the caller/agent interaction.

FIG. 1 is a flow diagram for a call center system processing an incoming call, according to some embodiments. Call center system 100 may capture high effort level statements made during interactive communications and may include, but is not limited to, a real-time voice-to-text transcription (transcribe the call), an effort level detector (e.g., a multi-class classification machine learning model) and an interactive communication summarizer. The call center system, given a call transcript up to a point in time, engages the machine learning model to capture and rank high effort level statements found within the transcript.

As shown, call center system 100 processes an incoming interactive communication, such as a customer call. System 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of one example call flow from incoming call to call agent assistance. Greater detail will be provided in the figures that follow.

Incoming call center calls are routed to a call agent 104 through a call router 102. Call router 102 may analyze pre-call information, such as a caller's profile, previous call interactions, voice menu selections or inputs to automated voice prompts. Call agents may be segmented into groups by subject matter expertise, such as experience with specific subjects or subject matter customer complaints. Understanding which call agent to route the incoming call to may ultimately determine a successful outcome, reduced call time and enhance a customer's experience.

Currently, most call routing is performed through an Interactive Voice Response system (IVR). The IVR is an automated phone system with call routing capabilities that allows customers to interact with a virtual assistant before speaking with an agent. The virtual assistant is essentially a prerecorded voice menu that can be navigated verbally or manually and collects information about the customer inquiry before automatically transferring the call to the most appropriate queue.

In some embodiments, the technology described herein may use historical data to train a machine learning model to automatically route calls. A database containing customer interactions with products and services helps determine where to route a customer's call based on their recent activity. This can include recent activity in an app, card transactions, searches on a website, etc. To predict which queue to route a customer call to, the system identifies all possible queues and the call reasons each addresses. Having identified the queues' common call reasons, the system frames this as a classification problem. Training labels from instances when a customer's issue may be resolved by using an original queue they were routed to and scenarios when a customer was transferred between agent queues. This training data may be sourced, for example, from a current IVR database, which routes customers based on the reason they provide the system for calling in. If a customer does not have a history with the call center, this too is valuable information to route their call, as new customers are likely to have similar needs. There are specific actions that a new customer may be expected to do for the first time and the system may directly check which of those actions have and have not been done. Some examples are provided below:
 1. Activating a new card
 2. Making a first payment
 3. Setting up Autopay to automatically make monthly payments
 4. Inquiring about a fee that appeared for the first time (late fee, interest charges, annual fees).

Once a call agent 104 is selected, automatic speech recognizer 106 may analyze the incoming caller's speech and call agent's speech in real time by sequentially analyzing utterances. Utterances may include a spoken word, statement, or vocal sound. However, utterances may be difficult to analyze without a proper understanding of how, for example, one utterance relates to another utterance. Languages follow known constructs (e.g., semantics), patterns, rules and structures. Therefore, these utterances may be analyzed using a systematic approach (described in greater detail in FIG. 3). Alternatively, or in addition to, one way to increase an understanding of utterances is to aggregate one or more utterances into related structures (segments). Auto-punctuator 108 may add punctuation to segments of utterances, thus grouping them into sentences, partial sentences, phrases or single words. For example, the sequential utterances " . . . problem with my credit card . . . " may have two different meanings based on punctuation. In a first scenario, punctuation after the word credit ("problem with my credit. Card . . . ") would indicate a credit issue. In a second scenario, punctuation after the word card ("problem with my credit card.") would indicate a credit card issue. Therefore, intelligent punctuation may suggest to the system contextually relevancy needed to properly address caller issues.

Automated Punctuator 108 may automatically punctuate text (speech) using a non-recurrent neural network in an embodiment of the present disclosure. As used herein, the term non-recurrent neural networks, which includes transformer networks, refers to machine learning processes and neural network architectures designed to handle ordered sequences of data for various natural language processing (NLP) tasks. The NLP tasks may include, for example, text translation, text summarization, text generation, sentence analysis and completion, determination of punctuation, or similar NLP tasks performed by computers. Further, non-recurrent neural networks do not require sequences of data to be processed in order. For example, if a sequence of data is a sequence of words of a natural language that form one or more sentences and that are to be processed by the non-recurrent neural network, the non-recurrent neural network does not need to process the words at the beginning of the sentence before it processes the words at the end of the sentence. This property allows for parallel processing of the data, resulting in faster processing times overall. Examples of non-recurrent neural networks include the Bidirectional Encoder Representations from Transformers (BERT) language model developed by Google™ and the Robustly-Optimized Bidirectional Encoder Representations from Transformers approach (ROBERTa) language model developed by Facebook™, as examples. In one embodiment, the automated punctuation service may be modeled based on BERT, ROBERTa, or similar language models.

Continuing with the example, in one embodiment, assuming that the input into system 100 is a customer's speech to be punctuated, the system 100 may begin performing its functions by applying the text string to obtain a representation of the meaning of each word in the context of the speech string.

The text string refers to a sequence of words that are unstructured (i.e., may not be in sentence form and contain no punctuation marks). In one embodiment, the text string may be generated based on an automatic speech recognition (ASR) recognizer 106 transcribing speech recordings to text. Based on the transcription and the spontaneous nature of spoken language, the text string likely contains errors or is incomplete. The errors may include, for example, incorrect words, filler words, false starts to words, incomplete phrases, muted or indistinguishable words, or a combination thereof, that make the text string unreadable or difficult to understand by a human or computer.

In one embodiment, the text string may be generated directly from ASR 106. In another embodiment, the text string may be received from a repository, database, or computer file that contains the text string. For example, in one embodiment, the text string may be generated by the ASR 106 and saved to a repository, database, or computer file, such as a .txt file or Microsoft Word™ file, as examples, for retrieval and receipt by automated punctuation model service.

In one embodiment, once the text string is received, the text string may be converted from text or character format into a numerical format by the system 100. In one embodiment, the conversion may be performed by converting each word of the text string into one or more tokens (see tokenizer 306). The one or more tokens refer to a sequence of real values that represent and map to each word of the text string. The one or more tokens allow each word of the text string to be numerically quantified so that computations may be performed on them, with the ultimate goal being to generate one or more contextualized vectors. The contextualized vectors refer to vectors that encode the contextualized meaning (i.e., contextualized word embeddings) of each of the tokens into a vector representation. The contextualized vectors are generated through the processes and methods used in language models such as the BERT and ROBERTa language models, which are known in the art. For the purposes of discussion throughout this application it is assumed that the contextualized vectors are generated based on such processes and methods.

Continuing with the example, the one or more tokens may be generated based on a variety of criteria or schemes that may be used to convert characters or text to numerical values. For example, in one embodiment, each word of a text string can be mapped to a vector of real values. The word may then be converted to the one or more tokens based on a mapping of the word via a tokenization process. Tokenization processes are known in the art and will not be further discussed in detail here.

In one embodiment, the formatted text string may further be transmitted for display or may be transmitted to a repository, database, or computer file, such as a .txt file or Microsoft Word™ file, as examples, to be saved for further retrieval by a user or components of the system 100.

Real-time automatic punctuation has several benefits for system 100. Firstly, callers often may speak in short sequences with errors and repetition not typically found in formatted text (e.g., complete sentences). Therefore, the punctuation may provide context to snippets making them more readable when properly punctuated. Humans comprehend written language better and faster when punctuated. This quick and thorough comprehension is especially important given the time-sensitive nature of feedback on a live customer call. Second, real-time automatic punctuation may provide boundary markers between cohesive semantic propositions (i.e., sentence-final punctuation). This is important because models can perform significantly better when given full sentences. Performance can be further improved when punctuation is included, as it helps demarcate syntactic boundaries (e.g. commas denoting clausal boundaries).

The automated punctuation model may be a network machine learning (e.g., deep neural) that performs multi-class classification over possible punctuation marks between words in unpunctuated text. The network uses a deep fully-connected bi-directional transformer-based pre-trained neural network language model (LM) as the core of the automatic text punctuation network. The network adds several additional layers after the pre-trained LM network with each layer preserving the fully-connected nature of the entire network. Each additional layer is trained from scratch before fine-tuning parameters of the entire network. The prediction of what punctuation to place after each word (including choosing no punctuation) is performed in parallel during both training and inference, which is a departure from most previous approaches for the punctuation task. Although prediction is performed in parallel, the system replicates the data to see the same number of inputs during training as a sequential prediction network. Furthermore, at inference time the model aggregates predictions across multiple context windows allowing greater context to be used in predicting a word's punctuation and providing robustness through an ensemble of multiple predictions.

As will be described in greater detail in FIG. 2, effort level detector 110 subsequently analyzes the utterances generated by the caller. For example, the effort level detector 110 may identify, in conjunction with automatic speech recognizer 106, utterances made by the caller based on a voice matching algorithm. While not described in great detail herein, it is to be understood that the caller's and call agent's speech are separated using known voice processing techniques. Subsequently, caller utterances are analyzed, utterance by utterance, by effort level detector 110 to determine an effort level (high/low) for the overall call.

Attention scorer 112 subsequently scores and ranks the scores of each individual utterance based on its importance to a sentence or the overall call. In some embodiments, the system includes a word-matching algorithm to detect high attention words within the interactive communication (call) as will be described in greater detail in FIG. 2. Alternately, or in addition, a frequency of a word occurrence may determine its importance within the call transcript.

While illustrated as separate components, the effort level detector 110 and the attention scorer may be combined into a single component without departing from the scope of the technology described herein.

Interactive communication summarizer 114 subsequently receives the ranked, scored utterances and selects highly ranked utterances for combination with other contextually supportive words to create summary wording/phrasing. The summaries may be communicated to call agent 104. For example, a call agent may receive possible summations of a current or previous call displayed on their computer screen. In a non-limiting example, high attention scored utterances (e.g., words or phrases) may include, or be combined with, introductory phrases or additional contextual information, such as product descriptions, customer options, financial information or steps that may provide a further understanding of the call content, subject or reasons for the call.

Figure 2:
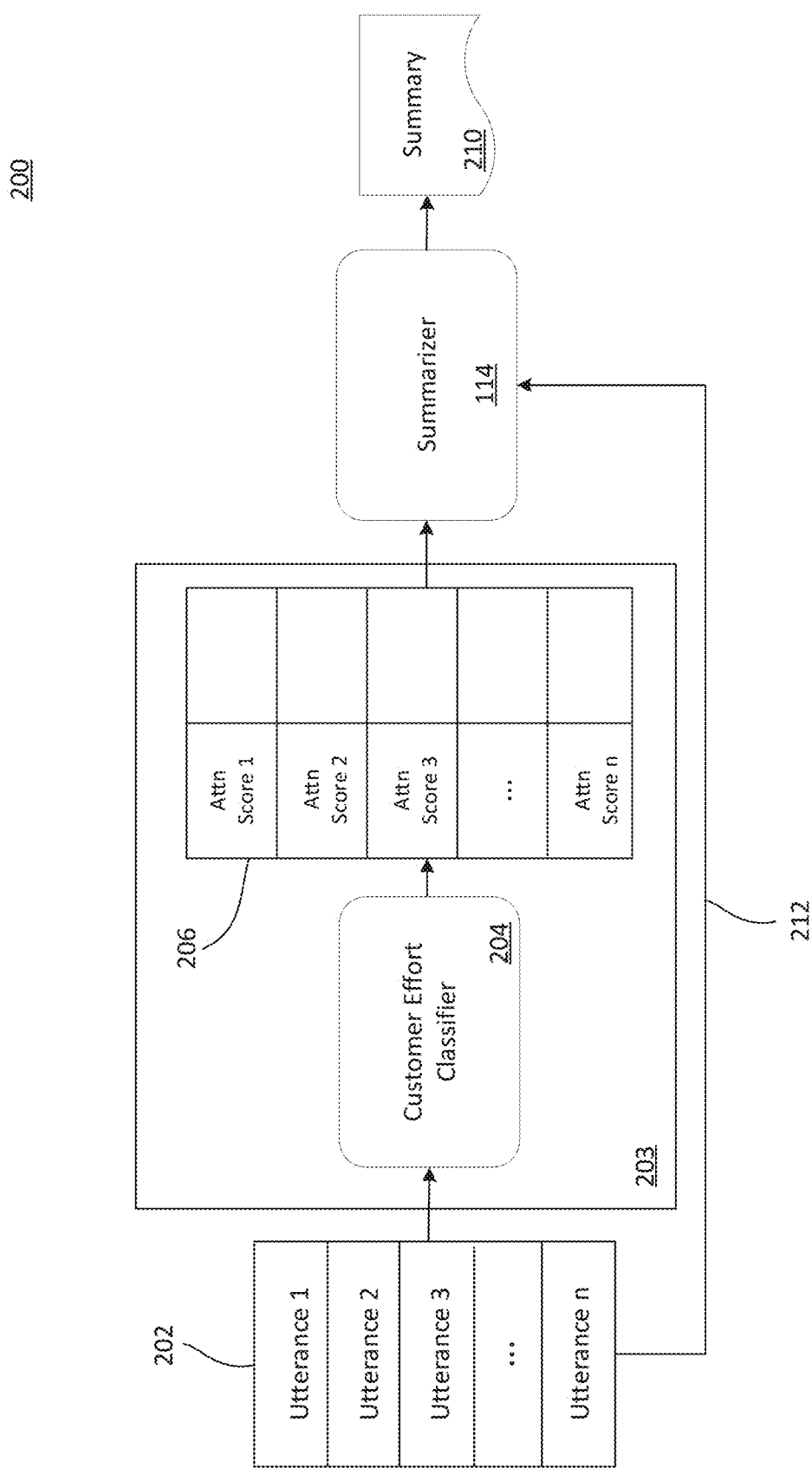
FIG. 2 is a block diagram for real-time call effort analysis and call summation, according to some embodiments.

FIG. 2 is a block diagram for real-time call utterance analysis and summation, according to some embodiments. The components described may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

As shown, a caller's speech may include a series of discrete utterances (1-n) 202. Each utterance may be, but is not limited to, a single word, a sound, a numeric representation (e.g., dollar amount or date), emotions (e.g., emotive words or phrases), truncated words (e.g., incomplete enunciations, slang, abbreviations (e.g., "ATM", "24/7", etc.), or abbreviated word versions ("lots" substituted for "a lot") or ancillary words or sounds (e.g., "Hmm", "um", pauses, etc.), common descriptors (e.g., "the", "a", etc.).

Utterances are fed to processor 203. Processor 203 may include the effort level detector 110 and attention scorer 112 as a single integrated component or as separate components. A customer effort classifier 204, discussed in greater detail in FIG. 4 and following, predicts the answer to the question 'Did the agent make it easy for you?' from a customer's perspective. The use of high effort words or phrasing (e.g., statements) during the call may indicate a high effort call. Statements are generally high effort, for example, "this is the 3rd time I am calling and still no resolution" is a high effort statement. However, some statements may reflect a low effort level, such as, "Awesome, this was easier than I thought it would be".

A deep learning model customer effort classifier 204 generates a binary label (e.g., low effort or high effort) predicting the effort level. In addition, customer effort classifier 204 produces an attention score for each utterance. In one embodiment, the scores are generated through a known technique called "attention mechanism" as taught by "Vaswani, A., Shazeer, N., Parmar, N., Uszkoreit, J., Jones, L., Gomez, A. N., & Polosukhin, I. (2017). 'Attention is all you need', Advances in Neural Information Processing Systems (pp. 5998-6008)". One skilled in the art will appreciate that other approaches for producing an attention score may be substituted without departing from scope of the technology disclosed herein. The utterances that have high attention scores contribute more to the summaries as they have a greater impact on the final classification.

Attention scores are ranked 206 (e.g., attention scores 1-n) and provided to interactive communication summarizer 114 to improve the summarizer. The summarizer has access to both the raw text of the utterances 212, as well as the output (threshold labels and ranked attention scores) from the customer effort model (see FIG. 4). The interactive communication summarizer can then determine an appropriate balance between the raw utterances and the predicted utterance effort in determining whether a candidate utterance is relevant to the summary 210. Summarizer captures the words or phrases with high attention scores to ensure that they are included in the summary. In order to generate the summary, a "generative summarization technique", as is known in the art, may be used to convert key words into sentences that are representative of the original call. One skilled in the art will appreciate that other approaches for producing various summary formats may be substituted without departing from scope of the technology disclosed herein. In addition, a "feedback loop" may be incorporated where the summary is provided back to the call agent during or after the call. The call agent is then able to provide a "thumbs up" or "thumbs down" assessment for a call summary. This feedback is then used for further fine-tuning of the framework, with a goal of further improving the interactive communication summarizer performance.

Figure 3:
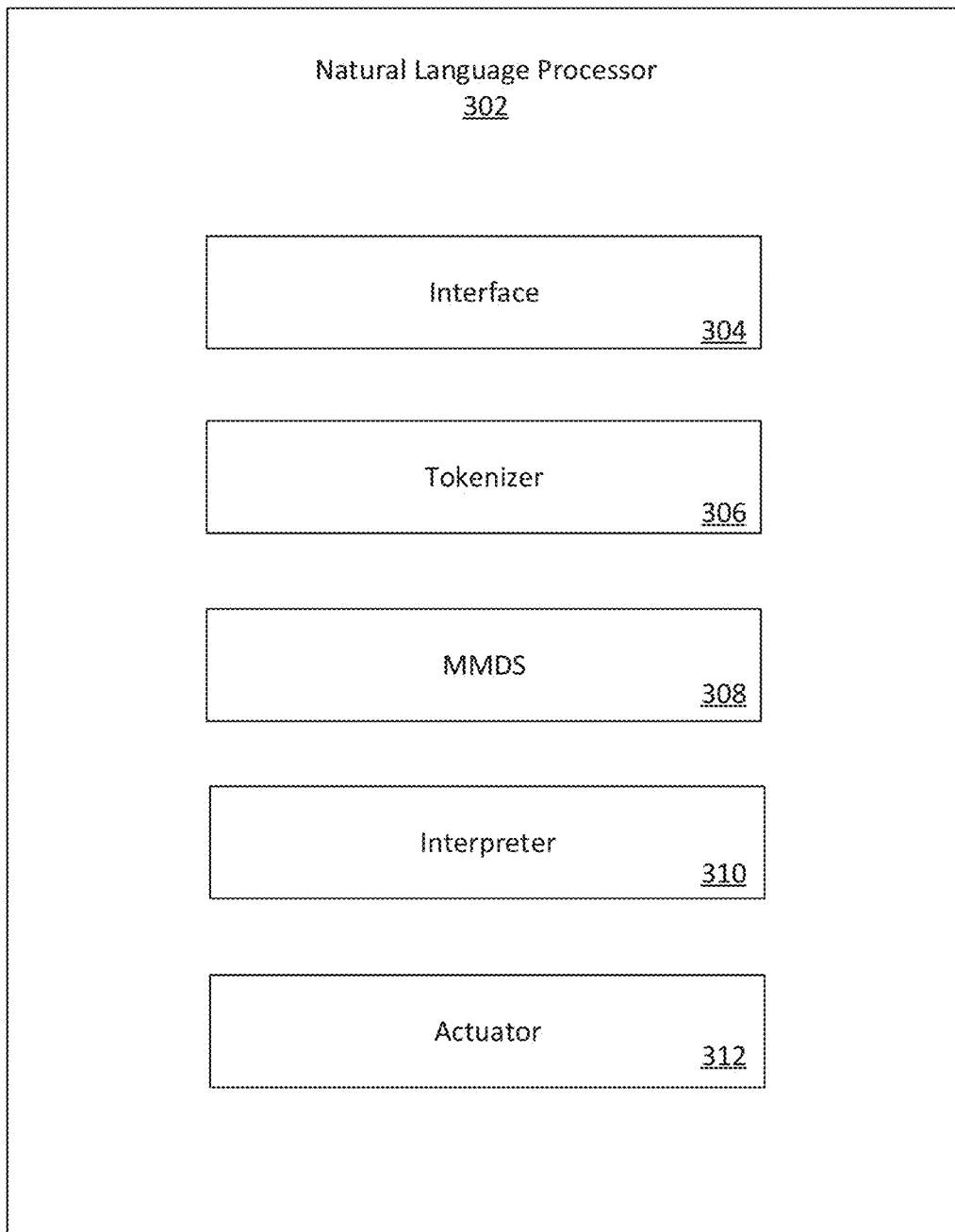
FIG. 3 is a block diagram for natural language processing of an incoming call, according to some embodiments.

FIG. 3 is a block diagram of a Natural Language Processor (NLP) system 300, according to some embodiments. The number of components in system 300 is not limited to what is shown and other variations in the number of arrangements of components are possible, consistent with some embodiments disclosed herein. The components of FIG. 3 may be implemented through hardware, software, and/or firmware. As used herein, the term non-recurrent neural networks, which includes transformer networks, refers to machine learning processes and neural network architectures designed to handle ordered sequences of data for various natural language processing (NLP) tasks. NLP tasks may include, for example, text translation, text summarization, text generation, sentence analysis and completion, determination of punctuation, or similar NLP tasks performed by computers.

As illustrated, system 300 may comprise a Natural Language Processor (NLP) 302. NLP 302 may include any device, mechanism, system, network, and/or compilation of instructions for performing natural language recognition of call transcripts consistent with the technology described herein. In the configuration illustrated in FIG. 3, NLP 302 may include an interface 304, a tokenizer 306, a Master and Metadata Search (MMDS) 308, an interpreter 310, and an actuator 312. In certain embodiments, components 304, 306, 308, 310, and 312 may each be implemented via any combination of hardware, software, and/or firmware.

Interface 304 may serve as an entry point or user interface through which one or more utterances, such as spoken words/phrases/sentences (speech), may be entered for subsequent recognition using an automatic speech recognition model. While described for spoken words throughout the application, text may be also be analyzed and processed using the technology described herein. For example, a pop-up chat session may be substituted for spoken words. In another embodiment, text from emails may be substituted for spoken words. In yet another embodiment, spoken words converted to text or text converted to spoken words, such as for blind or deaf callers, may be substituted without departing from the scope of the technology described herein.

In certain embodiments, interface 304 may facilitate information exchange among and between NLP 302 and one or more call agent systems. Interface 304 may be implemented by one or more software, hardware, and/or firmware components. Interface 304 may include one or more logical components, processes, algorithms, systems, applications, and/or networks. Certain functions embodied by interface 304 may be implemented by, for example, HTML, HTML with JavaScript, C/C++, Java, etc. Interface 304 may include or be coupled to one or more data ports for transmitting and receiving data from one or more components coupled to NLP 302. Interface 304 may include or be coupled to one or more user interfaces (e.g., a speaker, microphone, headset, or GUI).

In certain configurations, interface 304 may interact with one or more applications running on one or more computer systems. Interface 304 may, for example, embed functionality associated with components of NLP 302 into applications running on a computer system. In one example, interface 304 may embed NLP 302 functionality into a Web browser or interactive menu application with which a user (call agent) interacts. For instance, interface 304 may embed GUI elements (e.g., dialog boxes, input fields, textual messages, etc.) associated with NLP 302 functionality in an application with which a user interacts. Details of applications with which interface 304 may interact are discussed in connection with FIGS. 1-7.

In certain embodiments, interface 304 may include, be coupled to, and/or integrate one or more systems and/or applications, such as speech recognition facilities and Text-To-Speech (TTS) engines. Further, interface 304 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface 304 may receive natural language queries (e.g., word, phrases or sentences) from a caller and forward the queries to tokenizer 306.

Tokenizer 306 may transform natural language queries into semantic tokens. Semantic tokens may include additional information, such as language identifiers, to help provide context or resolve meaning. Tokenizer 306 may be implemented by one or more software, hardware, and/or firmware components. Tokenizer 306 may include one or more logical components, processes, algorithms, systems, applications, and/or networks. Tokenizer 306 may include stemming logic, combinatorial intelligence, and/or logic for combining different tokenizers for different languages. In one configuration, tokenizer 306 may receive an ASCII string and output a list of words. Tokenizer 306 may transmit generated tokens to MMDS 308 via standard machine-readable formats, such as the extensible Markup Language (XML).

MMDS 308 may be configured to retrieve information using tokens received from tokenizer 306. MMDS 308 may be implemented by one or more software, hardware, and/or firmware components. MMDS 308 may include one or more logical components, processes, algorithms, systems, applications, and/or networks. In one configuration, MMDS 308 may include an API, a searching framework, one or more applications, and one or more search engines.

MMDS 308 may include an API, which facilitates requests to one or more operating systems and/or applications included in or coupled to MMDS 308. For example, the API may facilitate interaction between MMDS 308 and one or more structured data archives (e.g., knowledge base).

In certain embodiments, MMDS 308 may be configured to maintain a searchable data index, including metadata, master data, metadata descriptions, and/or system element descriptions. For example, the data index may include readable field names (e.g., textual) for metadata (e.g., table names and column headers), master data (e.g., individual field values), and metadata descriptions. The data index may be implemented via one or more hardware, software, and/or firmware components. In one implementation, a searching framework within MMDS 308 may initialize the data index, perform delta indexing, collect metadata, collect master data, and administer indexing. Such a searching framework may be included in one or more business intelligence applications (e.g., helpdesk, chatbots, voice interactive components, etc.)

In certain configurations, MMDS 308 may include or be coupled to a low level semantic analyzer, which may be embodied by one or more software, hardware, and/or firmware components. The semantic analyzer may include components for receiving tokens from tokenizer 306 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS 308 may leverage various components and searching techniques/algorithms to search the data index using tokens received by tokenizer 306. MMDS 308 may leverage one or more search engines that employ partial/fuzzy matching processes and/or one or more Boolean, federated, or attribute searching components.

In certain configurations, MMDS 308 may include and/or leverage one or more information validation processes. In one configuration, MMDS 308 may leverage one or more languages for validating XML information. MMDS 308 may include or be coupled to one or more clients that include business application subsystems.

In certain configurations, MMDS 308 may include one or more software, hardware, and/or firmware components for prioritizing information found in the data index with respect to the semantic tokens. In one example, such components may generate match scores, which represent a qualitative and/or quantitative weight or bias indicating the strength/ correlation of the association between elements in the data index and the semantic tokens.

Figure 4:
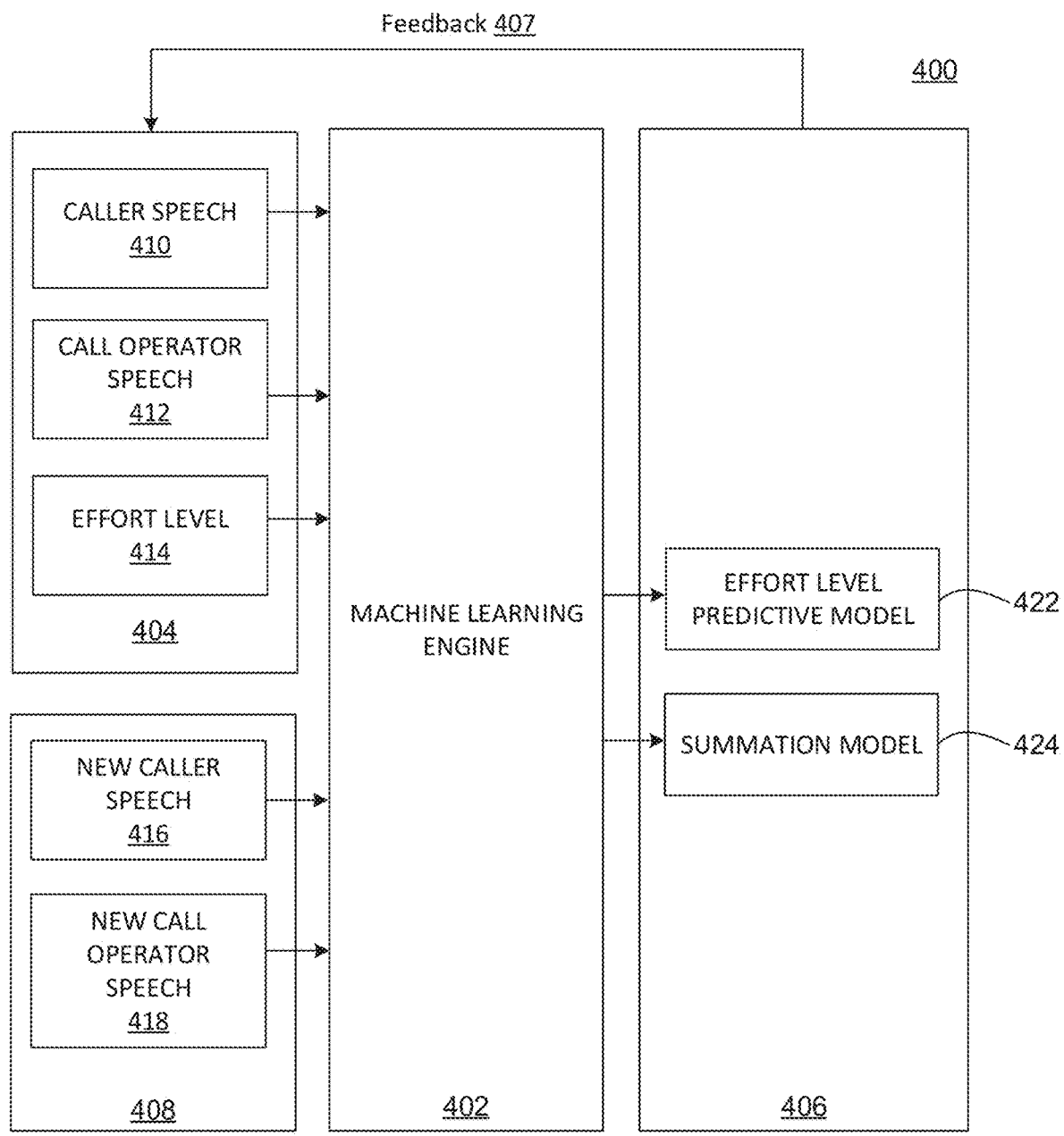
FIG. 4 is a block diagram for processing an incoming call with machine learning, according to some embodiments.

In one configuration, MMDS 308 may include one or more machine learning components to enhance searching efficacy as discussed further in association with FIG. 4. In one example, such a learning component may observe and/or log information requested by callers and may build additional and/or prioritized indexes for fast access to frequently requested data. Learning components may exclude frequently requested information from the data index, and such MMDS data may be forwarded to and/or included in interpreter 310.

MMDS 308 may output to interpreter 310 a series of meta and/or master data technical addresses, associated field names, and any associated description fields. MMDS 308 may also output matching scores to interpreter 310.

Interpreter 310 may process and analyze results returned by MMDS 308. Interpreter 310 may be implemented by one or more software, hardware, and/or firmware components. Interpreter 310 may include one or more logical components, processes, algorithms, systems, applications, and/or networks. In one example, interpreter 310 may include matching policy conditions against tokenized natural language queries and context information.

Consistent with embodiments of the present invention, interpreter 310 may be configured to recognize information identified by MMDS 308. For example, interpreter 310 may identify ambiguities, input deficiencies, imperfect conceptual matches, and compound commands. In certain configurations, interpreter 310 may initiate, configure, and manage user dialogs; specify and manage configurable policies; perform context awareness processes; maintain context information; personalize policies and perform context switches; and perform learning processes.

Interpreter 310 may filter information identified by MMDS 310 in order to extract information that is actually relevant to spoken inputs. That is, interpreter 310 may distill information identified by MMDS 308 down to information that is relevant to the words/sentences and in accordance with intent. Information provided by interpreter 310 may include function calls, metadata, and/or master data. In certain embodiments, a combination of elements may be arranged in specific sequence to ensure proper actuation. Further, appropriate relationships and dependencies among and between various elements of the combinations may be preserved/maintained. For example, meta and master data elements included in a combination may be used to populate one or more function calls included in that combination.

Actuator 312 may process interpreted information provided by interpreter 310. Actuator 312 may be implemented by one or more software, hardware, and/or firmware components. Actuator 312 may include one or more logical components, processes, algorithms, systems, applications, and/or networks. Actuator 312 may be configurable to interact with one or more system environments.

Consistent with embodiments of the present invention, actuator 312 may be configured to provide information to one or more users/systems (e.g., Automatic Speech recognizer 106, optional Automated Punctuator 108, etc., as shown in FIG. 1). In such embodiments, actuator may interact with one or more information display devices.

In certain embodiments, actuator 312 may be configured to send requests to one or more devices and/or systems using, for example, various APIs. Actuator 312 may generate one or more presentations based on responses to such commands.

For clarity of explanation, interface 304, tokenizer 306, MMDS 308, interpreter 310, and actuator 312 are described as discrete functional elements within NLP 302. However, it should be understood that the functionality of these elements and components may overlap and/or may exist in fewer elements and components. Moreover, all or part of the functionality of these elements may co-exist or be distributed among several geographically-dispersed locations.

FIG. 4 is a block diagram of a machine learning system, according to some embodiments. A machine learning system 400 may include a machine learning engine 402 of one or more servers (cloud or local) processing audio text (speech), such as words, phrases or sentences, to recognize relationships of words (e.g., within sentences) received by natural language system 300. As described in various embodiments, machine learning engine 402 may be used to predict and score effort levels within interactive communications (e.g., incoming calls). While described in stages, the sequence may include more or less stages or be performed in a different order.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine 402 may uses various classifiers to map concepts associated with a specific language structure to capture relationships between concepts and words/phrases/sentences. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify speech patterns within varying speech structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of word recognition, a dataset of audio/word matches may be used.

In a first stage, training data set 404 (in this case, caller speech data 410, call agent (operator) speech data 412, effort levels 414, etc.)) may be ingested to train various predictive models 406. In a first case example, an effort level predictive model 422 may be trained based on machine learning engine 402 processing training data set 404. Training a model means learning (determining) values for weights as well as inherent bias from labeled examples. In supervised learning, a machine learning algorithm builds a model by examining many examples and attempting to find a model that minimizes loss; this process is called empirical risk minimization. In this case, the effort level predictive model recognizes previous calls and associated effort levels (e.g., binary effort of high/low) to infer (predict) an effort level and attention level scores for future interactive communications (e.g., calls).

Alternately, or in addition, in a second case example, the first stage may be trained by an alternate training data set 404 that may also include one or more of caller speech, call operator speech, effort levels, attention scores and subsequent summations as training data 404. This training data 404 may be ingested to train summation model 424. As previously described, a language model assigns a probability of a next word in a sequence of words. A conditional language model is a generalization of this idea: it assigns probabilities to a sequence of words given some conditioning context. In this case, the summation model recognizes previous calls, previous associated effort levels (e.g., binary effort of high/low), previous attention level scores and associated summations to infer future words/phrasing for summations of interactive communications (e.g., calls).

In a second stage, the training cycle continuously looks at results, measures accuracy and fine-tunes the inputs to the modeling engine (feedback loop 407) to improve capabilities of the various predictive models 406.

In addition, as various predictive models (algorithms) 406 are created, they are stored in a database (not shown). For example, as the training sets are processed through the machine learning engine 402, the routing predictive model 422 may change (tuning/fine tuning) and therefore may be recorded in the database.

Future new data 408 (e.g., new call speech data 416, new call agent (operator) speech data 418) may be subsequently evaluated with the trained predictive models 406. For example, machine learning engine 402 processes this training set to recognize call interactions that previously resulted in successful outcomes (e.g., highly rated summations) based on specific summation wording or phrasing chosen by the summation model. Once the predictive models 406 has been trained to recognize patterns of behavior that resulted in successful behavior, it may take as an input any future behavior and correlate to determine a higher likelihood of successful outcome. Interactive communication summarizer 114 may suggest phrases that are considered relevant to provide a successful outcome (complete summary) and communicate the summation to call agent 104. For example, the call agent will receive the summary displayed on their computer screen. The call agent may then approve or disapprove the summary. Alternately, or in addition, the call agent may provide a quality ranking (e.g., 1-5) of their impression of the accuracy of the summary. Call agent feedback may be fed back into the machine learning engine as a feedback 407 to improve future training cycles.

Figure 5:
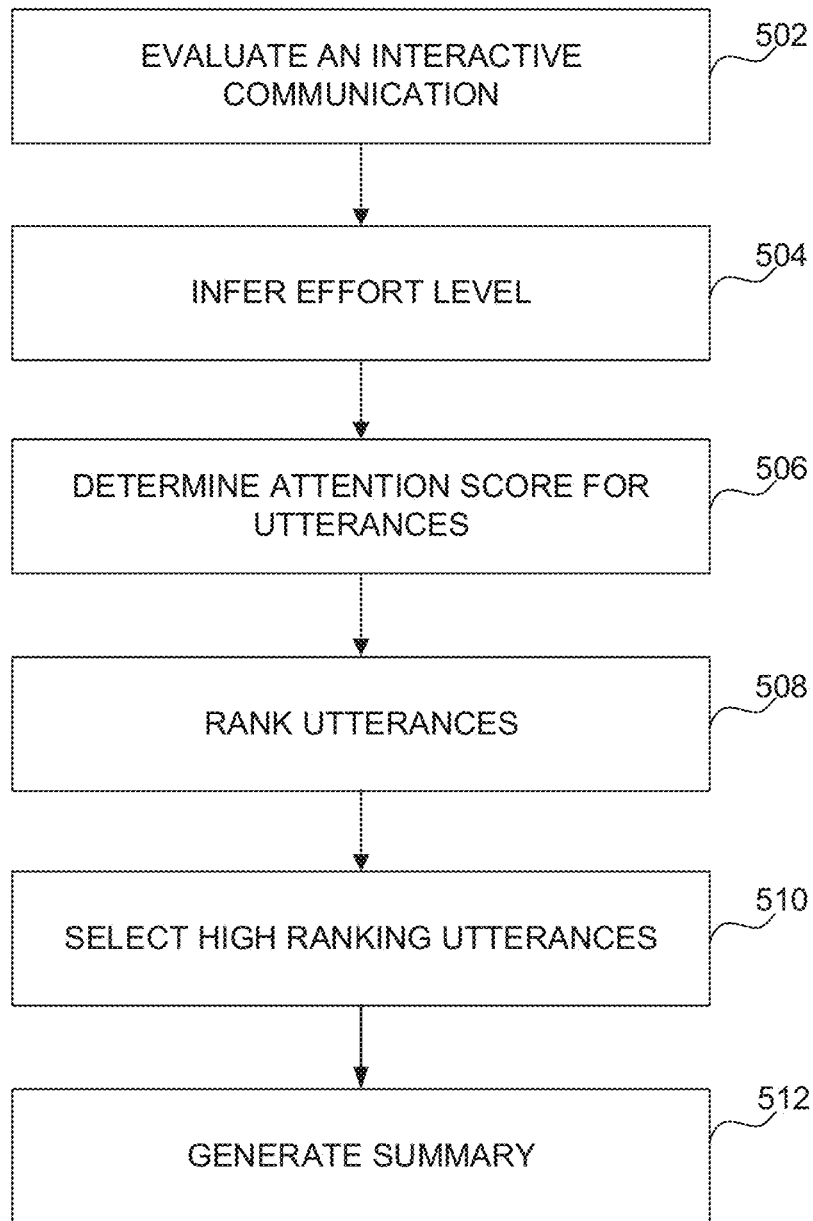
FIG. 5 is a flow diagram for real-time call processing, according to some embodiments.

FIG. 5 is a flow diagram 500 for real-time call processing, according to some embodiments.

In 502, automatic speech recognizer 106 may evaluate an incoming call based on interactive speech utterances. The interactive speech utterances will be separated into caller and call agent utterances and converted to text (transcript). While not described in great detail herein, it is to be understood that the caller's and call agent's speech utterances are separated using known voice processing techniques.

In 504, call center system 100 may classify an incoming call based on the caller's interactive speech utterances. A machine learning engine 402 instantiates a previously trained effort level predictive model 422 to infer effort levels of these new caller utterances.

In 506, based on utterances of the caller, a corresponding machine learning classifier evaluates an interactive communication between a first participant and a second participant to obtain an attention score for a plurality of utterances by the first participant, wherein the attention score is based at least partially on a calculated importance of an individual utterance relative to the plurality of utterances. In one embodiment, the system performs classification on a turn level (i.e., every time a new utterance is available). However, performing this classification in real-time enables the system to track effort level changes over the course of a call.

In 508, call center system summarizer 114 is configured to rank the plurality of utterances based on the effort levels and attention scores. Effort levels are binary: high and low. Attention scores are numbers, which indicate how each word helps come up with the overall effort level decision.

In 510, call center system summarizer 114 is configured to select, based on the ranking, one or more utterances of the plurality utterances from the interactive communication. In one non-limiting example, the call center system may select a predetermined number of highest ranked scored utterances for use in a subsequent summation. Alternately, or in addition, the call center system may use one or more utterances above a rank threshold (e.g., above 90% importance). In another non-limiting example, a call transcript without highly scored utterances (i.e., only low scored utterances), may select no utterances for a summary or may select one or more utterances of a highest score. Alternately, or in addition, the call center system may use one or more utterances with a band of utterance rankings.

In 512, call center system 100, based on at least the selected utterances, generates a summary of the interactive communication with at least the one or more selected utterances with supportive text or phrasing. Interactive communication summarizer 114 may suggest phrases that are considered relevant to provide a successful outcome (complete summary) and communicate the summation to call agent 104. For example, the call agent will receive the summary displayed on their computer screen. The call agent may then approve or disapprove the summary. Alternately, or in addition, the call agent may provide a quality ranking (e.g., 1-5) of their impression of the accuracy of the summary. Call agent feedback may be fed back into the machine learning engine as an input to improve future training cycles.

Throughout this disclosure, utterance analysis has been described for caller utterances. However, one skilled in the art will appreciate that other approaches, such as substituting call agent utterances or a combination of both the caller and call agent utterances, may be contemplated without departing from the scope of the technology described herein.

FIGS. 6A and 6B illustrate multiple examples of real-time summaries for agents, as per some embodiments. The tables show sample utterances from transcripts that had high attention scores from the customer effort classifier 204 and the rightmost column provides sample summaries. As can be seen in the examples, utterances with high attention scores may generate high quality call summaries that may be quickly read to understand what the call was about and the effort level of the call made in an attempt to resolve an issue.

FIG. 6A illustrates four call samples.

In a first non-limiting example, call utterances 602 illustrate a high effort statement (H) with high attention scored words "app" and "phone number" that are reflected in a subsequent summary 610 with contextually supportive text. The entire statement shows that customer is having trouble and their perceived effort is high. "app" and "phone number" reflect what they are having trouble with and, therefore, the attention scores are high for those words.

In a second non-limiting example, call utterances 604 illustrate a high effort level. High attention scored words "my card's" are reflected in a subsequent summary 612 with contextually supportive text.

In a third non-limiting example, call utterances 606 illustrate a high effort statement (H) with high attention scored word "fraud" that is reflected in a subsequent summary 614 with contextually supportive text.

In a fourth non-limiting example, call utterances 608 illustrate a high effort statement with high attention scored phrase "I don't want to get my routing number" that are reflected in a subsequent summary 616 with contextually supportive text. For example, the high effort level may be expected if the customer feels like they are spending too much energy/effort/time on trying to fix their issue. FIG. 6B illustrates an additional four call samples.

In a fifth non-limiting example, call utterances 618 (continuation of 608) illustrate a high effort statement (H) with no high attention score words that fail to subsequently generate a summary 626.

In a sixth non-limiting example, call utterances 620 illustrate a high effort statement (H) with high attention score words "current virus" and "payment" that are reflected in a subsequent summary 628 with contextually supportive text.

In a seventh non-limiting example, call utterances 622 illustrate a low effort statement (L) with high attention score words "card", "declined" and "first time" that are reflected in a subsequent summary 630 with contextually supportive text.

In an eighth non-limiting example, call utterances 624 illustrate a high effort statement (H) with high attention score words "block", "merchant" and "future" that are reflected in a subsequent summary 632 with contextually supportive text.

Figure 7:
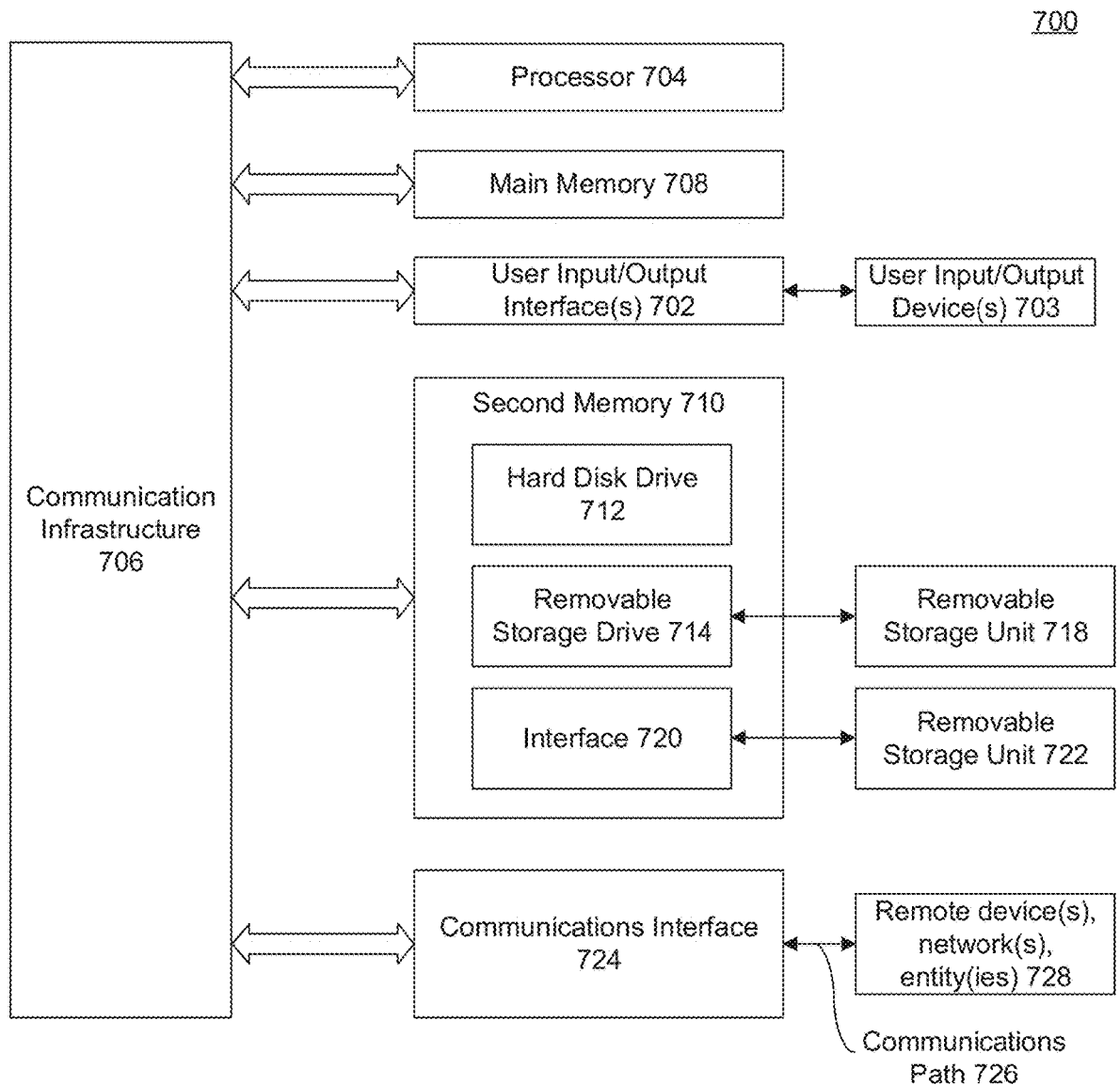
FIG. 7 is an example computer system useful for implementing various embodiments.

Various embodiments can be implemented, for example, using one or more computer systems, such as computer system 700 shown in FIG. 7. Computer system 700 can be used, for example, to implement method 500 of FIG. 5. Computer system 700 can be any computer capable of performing the functions described herein. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired, and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for ranking utterances in a natural language processing environment, the system comprising:
   a text generator configured to:

generate a textual transcript of individual utterances of a first participant from an interactive communication between the first participant and a second participant;
a machine learning customer effort predictor configured to:
evaluate the textual transcript of individual utterances of the first participant to determine a binary effort level label for a plurality of the individual utterances of the first participant; and
evaluate the textual transcript of individual utterances of the first participant to generate attention scores for the plurality of the individual utterances of the first participant; and
an interactive communication summarizer configured to:
rank the plurality of the individual utterances of the first participant based on the binary effort level label and the attention scores;
select, based on the ranking, one or more utterances of the plurality of the individual utterances of the first participant; and
generate a summary of the interactive communication with the selected one or more utterances.

2. The system of claim 1, wherein the first participant is a customer and the machine learning customer effort predictor is based on deep learning.

3. The system of claim 2, wherein the machine learning customer effort predictor is trained based on training parameters comprising a plurality of customer satisfaction outcomes.

4. The system of claim 3, wherein the training parameters further comprise a recorded customer level of effort by the first participant or a second recorded customer level of effort by the second participant.

5. The system of claim 1, wherein the attention scores are based, at least partially, on a calculated importance of the individual utterances relative to the plurality of the individual utterances of the first participant.

6. The system of claim 5, wherein the calculated importance is based on the machine learning customer effort predictor assigning a weighted importance value for the plurality of the individual utterances of the first participant.

7. The system of claim 1, wherein the binary effort level label reflects a classification of a high effort level or a low effort level and is classified as the high effort level based on an aggregation of the attention scores reaching a threshold.

8. The system of claim 1, wherein the system further comprises a feedback system configured to:
assess a quality of the generated summary and feed a corresponding assessment to the machine learning customer effort predictor.

9. A computer-implemented method for ranking utterances in a natural language processing environment, comprising:
generating, by a text generator, a textual transcript of individual utterances of a first participant from an interactive communication between the first participant and a second participant;
evaluating, by a machine learning customer effort predictor, the textual transcript of individual utterances of the first participant to determine a binary effort level label for a plurality of the individual utterances by the first participant;
evaluating, by the machine learning customer effort predictor, the textual transcript of individual utterances of the first participant to generate attention scores for the plurality of the individual utterances by the first participant;
and
ranking, by an interactive communication summarizer, the plurality of the individual utterances based on the binary effort level label and the attention scores;
selecting, by the interactive communication summarizer and based on the ranking, one or more utterances of the plurality of the individual utterances from the interactive communication; and
generating, by the interactive communication summarizer, a summary of the interactive communication with at least the one or more utterances.

10. The computer-implemented method of claim 9, further comprising selecting the one or more utterances by selecting one or more of highest ranked ones of the plurality of the individual utterances.

11. The computer-implemented method of claim 9, further comprising training the machine learning customer effort predictor based on a plurality of customer satisfaction outcomes.

12. The computer-implemented method of claim 11, wherein the customer satisfaction outcomes are based on a first recorded customer level of effort by the first participant or a second recorded customer level of effort by the second participant.

13. The computer-implemented method of claim 9, wherein the attention scores are based, at least partially, on a calculated importance of the individual utterances relative to the plurality of the individual utterances of the first participant.

14. The computer-implemented method of claim 13, wherein the calculated importance is based on the machine learning customer effort predictor assigning a weighted importance value for the plurality of the individual utterances.

15. The computer-implemented method of claim 9, further comprising that the binary effort level label is a high effort level or a low effort level.

16. The computer-implemented method of claim 9, further comprising receiving, by the machine learning customer effort predictor, a quality of the generated summary as training feedback.

17. A non-transitory computer-readable device having instructions stored thereon that, when executed by at least one computing device, cause the at least one computing device to perform natural language processing operations comprising:
generating, by a text generator, a textual transcript of individual utterances of a first participant from an interactive communication between the first participant and a second participant;
evaluating, by a machine learning customer effort predictor, the textual transcript of individual utterances of the first participant to determine a binary effort level label for a plurality of the individual utterances by the first participant;
evaluating, by a machine learning customer effort predictor, the textual transcript of individual utterances of the first participant to generate attention scores for the plurality of the individual utterances by the first participant, wherein the attention scores are based at least partially on a calculated importance of the individual utterances relative to the plurality of the individual utterances; and
ranking, by a summarization model, the plurality of the individual utterances based on the binary effort level label and the attention scores;

selecting, by the summarization model and based on the ranking, one or more utterances of the plurality of the individual utterances from the interactive communication; and generating, by the summarization model, a summary of the interactive communication with the selected one or more utterances.

18. The non-transitory computer-readable device of claim 17, further configured to perform operations comprising:
training the machine learning customer effort predictor based on a plurality of customer satisfaction outcomes.

19. The non-transitory computer-readable device of claim 18, wherein the customer satisfaction outcomes are based on a first customer level of effort recorded by the first participant or a second customer level of effort recorded by the second participant.

20. The non-transitory computer-readable device of claim 17, further configured to perform operations comprising:
receiving an assessment of a quality of the generated summary as training data and feeding the training data to the machine learning customer effort predictor.

* * * * *